United States Patent
Broadwell, III

(10) Patent No.: US 11,457,620 B1
(45) Date of Patent: Oct. 4, 2022

(54) PEST CONTROL ASSEMBLY

(71) Applicant: Christian Horatio Broadwell, III, Phoenix, AZ (US)

(72) Inventor: Christian Horatio Broadwell, III, Phoenix, AZ (US)

(*) Notice: Subject to any disclaimer, the term of this patent is extended or adjusted under 35 U.S.C. 154(b) by 168 days.

(21) Appl. No.: 16/683,591

(22) Filed: Nov. 14, 2019

Related U.S. Application Data

(60) Provisional application No. 62/769,221, filed on Nov. 19, 2018.

(51) Int. Cl.
*A01M 1/20* (2006.01)
*F16L 55/07* (2006.01)
*A01M 29/34* (2011.01)
*F16L 55/115* (2006.01)

(52) U.S. Cl.
CPC .......... *A01M 1/2027* (2013.01); *A01M 29/34* (2013.01); *F16L 55/07* (2013.01); *F16L 55/1152* (2013.01)

(58) Field of Classification Search
CPC .... A01M 1/20; A01M 1/2022; A01M 1/2027; A01M 1/2023; A01M 1/2044; A01M 1/2055; A01M 1/24; A01M 1/245; A01M 13/00; A01M 29/00; A01M 29/12; A01M 29/34; A01M 2200/001; A01M 2200/011
USPC ....... 43/124, 125, 129, 132.1; 239/6, 34, 44, 239/45, 51.5, 53, 54, 55, 56, 57, 59, 60; 422/1, 5, 28
See application file for complete search history.

(56) References Cited

U.S. PATENT DOCUMENTS

| | | | | |
|---|---|---|---|---|
| 2,971,650 A * | 2/1961 | Miranda | ................. | E04D 13/08 210/447 |
| 3,703,302 A * | 11/1972 | Dernier, Sr. | ............. | E03C 1/22 285/139.1 |
| 3,802,466 A * | 4/1974 | Panella | ................. | F16L 55/115 138/89 |
| 4,179,762 A * | 12/1979 | Barnhardt | ............... | E03C 1/282 137/247.51 |
| 4,506,705 A * | 3/1985 | Thompson | ............ | F16L 55/132 138/89 |
| 5,769,565 A * | 6/1998 | Martin, Jr. | ................ | E03F 5/02 137/370 |
| 6,813,858 B1 * | 11/2004 | Wright | .................. | A01M 1/026 43/124 |

(Continued)

FOREIGN PATENT DOCUMENTS

KR 200169842 Y1 * 2/2000

OTHER PUBLICATIONS

Machine Translation for KR2001169842, Sep. 2021.*

*Primary Examiner* — Joshua J Michener
*Assistant Examiner* — Nicole Paige Maccrate
(74) *Attorney, Agent, or Firm* — Plager Schack LLP; Mark H. Plager; Michael J. O'Brien

(57) ABSTRACT

A pest control assembly is configured to prevent pests from entering a structure. The pest control assembly has a plumbing system, with a drain line joined to a first cleanout. A ledge is arranged on the first cleanout. A pest control insert placed upon the ledge and further comprising a cylindrical body further having a plurality of openings are arranged upon an upper half of the cylindrical body. A chlorine gas emitted from the cylindrical body through the plurality of openings prevents pests from entering the structure.

5 Claims, 4 Drawing Sheets

(56) References Cited

U.S. PATENT DOCUMENTS 7,887,697 B2 * 2/2011 Worth .................... E03C 1/126
  210/164
9,592,310 B1 * 3/2017 Hughes ................ C01B 11/022

* cited by examiner

PEST CONTROL ASSEMBLY

RELATED APPLICATION

This application claims priority to provisional patent application U.S. Ser. No. 62/769,221 filed on Nov. 19, 2018, the entire contents of which is herein incorporated by reference.

BACKGROUND

The embodiments herein relate generally to structures and civil engineering.

Prior to embodiments of the disclosed invention, roaches and other insects could access an interior of a structure such as a home or a building through a drain pipe. Embodiments of the disclosed invention solve this problem.

SUMMARY

A pest control assembly is configured to prevent pests from entering a structure. The pest control assembly has a plumbing system, with a drain line joined to a first cleanout. A ledge is arranged on the first cleanout. A pest control insert placed upon the ledge and further comprising a cylindrical body further having a plurality of openings are arranged upon an upper half of the cylindrical body. A chlorine gas emitted from the cylindrical body through the plurality of openings prevents pests from entering the structure.

In some embodiments, an upper lip is joined to the cylindrical body with an outwardly flared funnel. The upper lip rests upon the ledge. A convex bulb can be joined to the cylindrical body.

A chlorine tablet in a solution is within the convex bulb. The chlorine tablet dissolves in the solution creating the chlorine gas.

Internal threads can be joined to an open end of the first cleanout. A lid further comprising external threads that can be mated to the internal threads in order to join the lid to the first cleanout.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
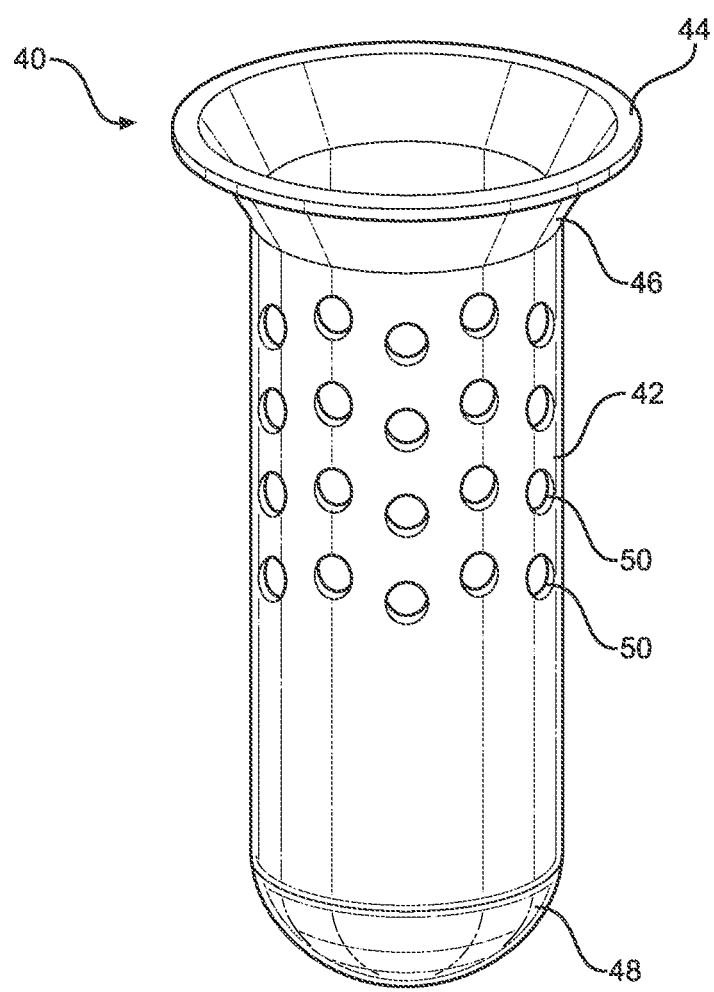
FIG. 1 shows a perspective view of one embodiment of the present invention.
Figure 2:
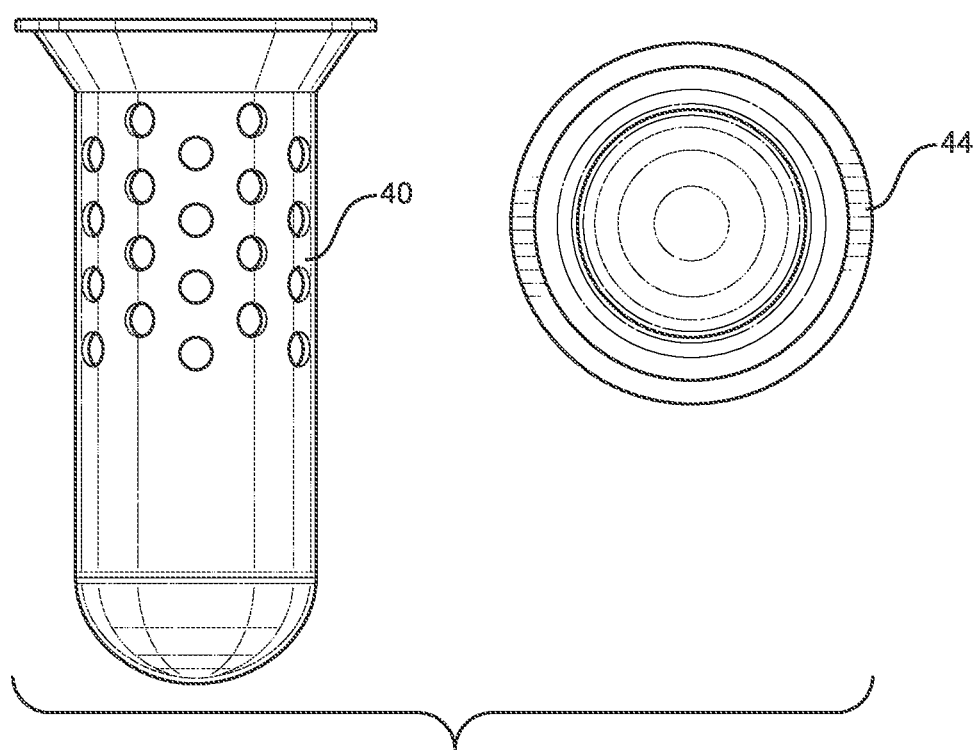
FIG. 2 shows a front and top view of one embodiment of the present invention.
Figure 3:
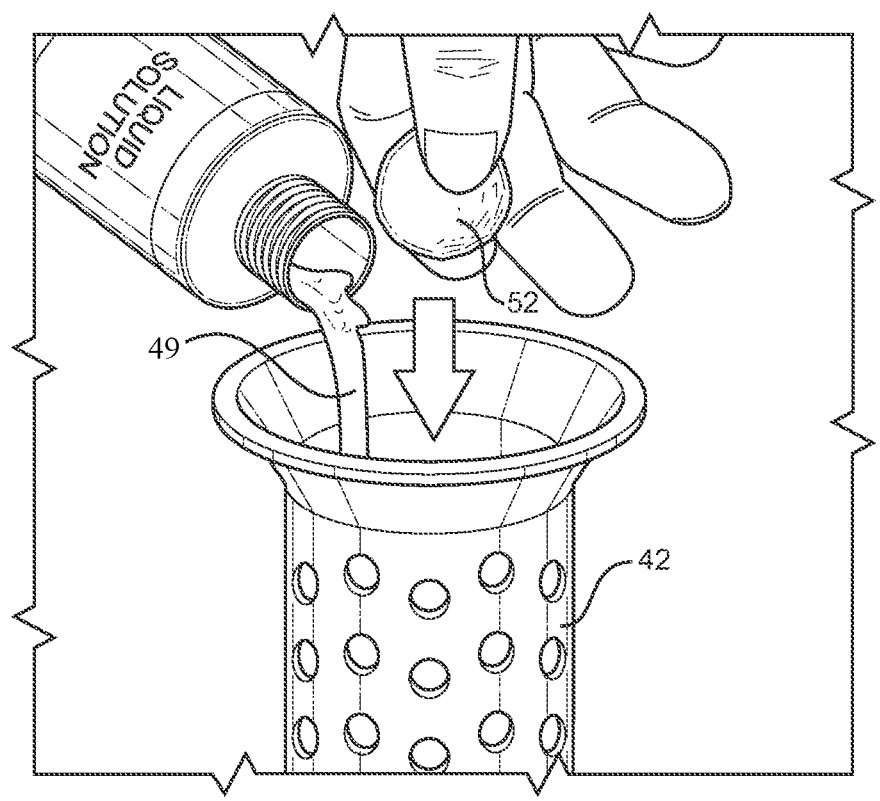
FIG. 3 shows a front view of one embodiment of the present invention.
Figure 4:
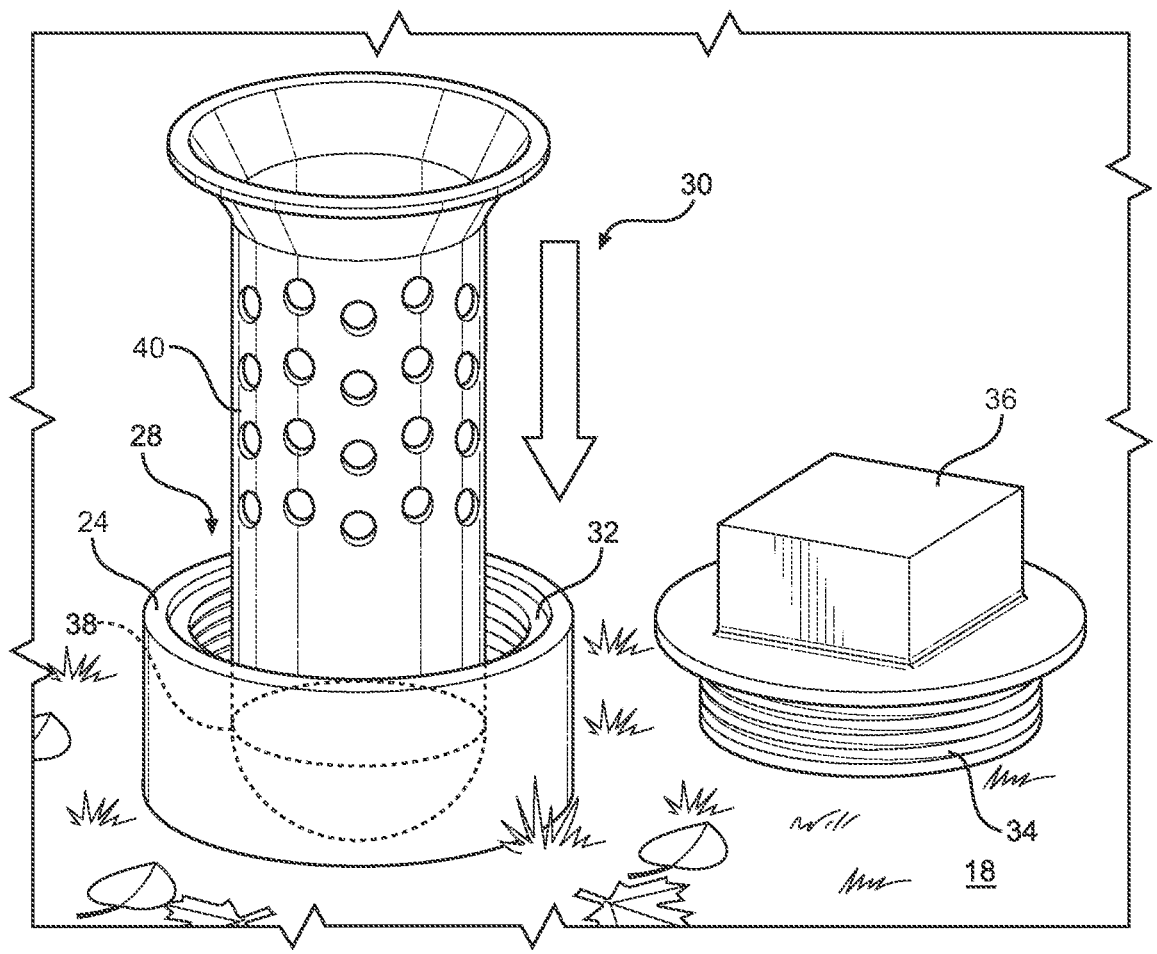
FIG. 4 shows a perspective view of one embodiment of the present invention.
Figure 5:
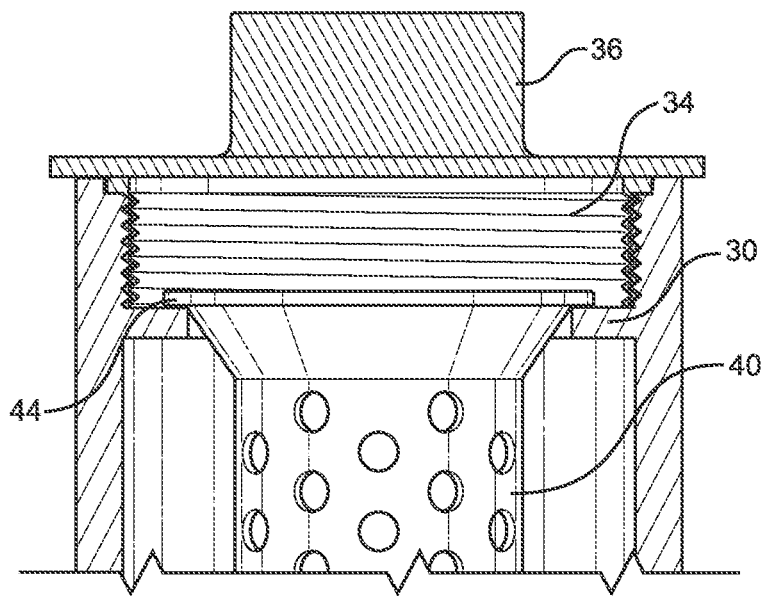
FIG. 5 shows a schematic view of one embodiment of the present invention.
Figure 6:
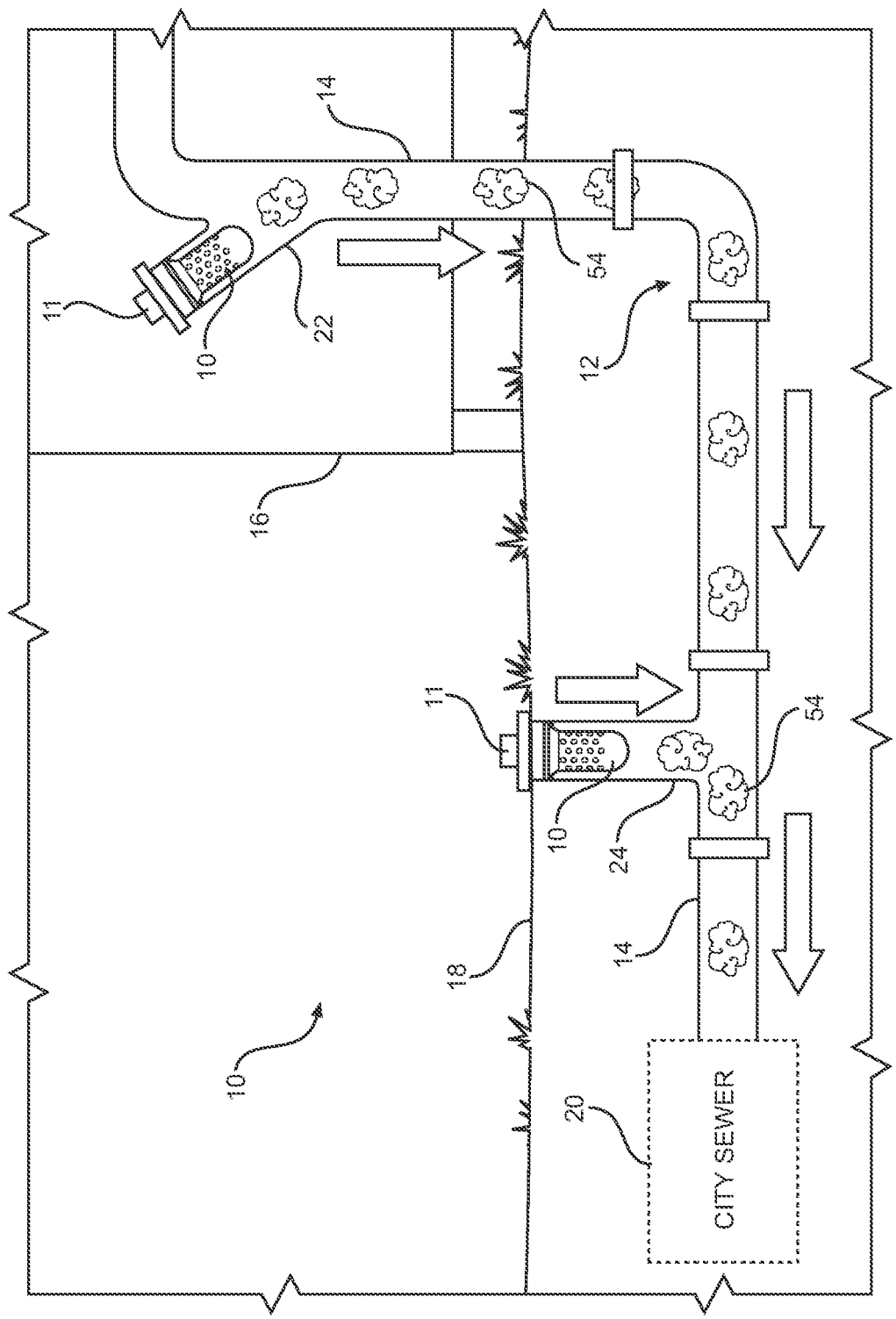
FIG. 6 shows a schematic view of one embodiment of the present invention.

By way of example, and referring to FIGS. 1-6, one embodiment of a pest control assembly 10 further comprises a plumbing system 12. The plumbing system 12 further comprises a drain line 14 that extends from a structure 16 beneath a ground surface 18 to a sewer system 20. The drain line 14 is further attached to an indoor cleanout 22 located within the structure 16 and an outdoor cleanout 24 located outside of the structure 16 and extending through the ground surface 18.

Each of the indoor cleanout 22 and the outdoor cleanout 24 further comprise a cylindrical portion 26 having an open end 28 at an access point 30. The open end 28 is proximate internal threads 32 which can accommodate external threads 34 of a lid 36. Further, the open end 28 further comprises a ledge 38. In some embodiments a washer can be used to extend the ledge 38 in a wider diameter cleanout.

Each of the indoor cleanout 22 and the outdoor cleanout 24 is connected to a pest control insert 40. The pest control insert 40 further comprises a cylindrical body 42. The cylindrical body 42 is joined to an upper lip 44 with an outwardly flared funnel 46. The upper lip 44 is configured to rest upon the ledge 38. The cylindrical body 42 is further joined to a convex bulb 48. A plurality of openings 50 are arranged upon an upper half of the cylindrical body 42.

A tablet 52 is inserted into the convex bulb 48 along with a dissolving solution 49. The tablet 52 can be a chlorine tablet. The combination of chlorine tablet with dissolving solution produces a low-grade chlorine gas 54 inside a center of the drain line 14 that is released through the plurality of openings 50 in the cylindrical body 42 to prevent pests from entering the structure 16 through a drain line access port by creating an invisible barrier. The low-grade gas 54 is heavier than air and flows outwardly with waste water to cause pests to turn away from the pipe that has the pest control insert 40 installed In some embodiments the low-grade chlorine gas 54 lasts at a sufficient concentration to keep pests from entering the drain line 14 for thirty days. At that point a new tablet 52 and solution needs to be inserted into the convex bulb 48.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A pest control assembly, configured to prevent pests from entering a structure; the pest control assembly comprises;
   a plumbing system, further comprising a drain line joined to a first cleanout;
   a ledge, arranged on the first cleanout;
   a pest control insert, placed upon the ledge and further comprising a cylindrical body further comprising a plurality of openings are arranged upon an upper half of the cylindrical body;
   an upper lip, joined to the cylindrical body with an outwardly flared funnel;
   wherein the upper lip rests upon the ledge;
   wherein, in use, the plurality of openings in the cylindrical body are configured to emit a chlorine gas thus preventing pests from entering the structure.

2. The pest control assembly of claim 1, further comprising a convex bulb, joined to the cylindrical body.

3. The pest control assembly of claim 2,
   wherein the chlorine gas is formed by a chlorine tablet in a solution within the convex bulb;
   wherein the chlorine tablet is configured to dissolve in the solution to create the chlorine gas.

4. The pest control assembly of claim 3, further comprising internal threads joined to an open end of the first cleanout.

5. The pest control assembly of claim 4, further comprising a lid further comprising external threads that are mated to the internal threads in order to join the lid to the first cleanout.

* * * * *